US009596651B2

(12) United States Patent
Jafarian et al.

(10) Patent No.: US 9,596,651 B2
(45) Date of Patent: *Mar. 14, 2017

(54) METHODS AND APPARATUS FOR LOW POWER WAKE UP SIGNAL AND OPERATIONS FOR WLAN

(71) Applicant: Qualcomm Incorporated, San Diego, CA (US)

(72) Inventors: Amin Jafarian, San Diego, CA (US); Simone Merlin, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/098,917

(22) Filed: Apr. 14, 2016

(65) Prior Publication Data

US 2016/0242115 A1 Aug. 18, 2016

Related U.S. Application Data

(63) Continuation of application No. 14/167,723, filed on Jan. 29, 2014, now Pat. No. 9,351,250.

(Continued)

(51) Int. Cl.
*H04W 84/12* (2009.01)
*H04W 52/02* (2009.01)
(Continued)

(52) U.S. Cl.
CPC ... *H04W 52/0216* (2013.01); *H04W 52/0225* (2013.01); *H04W 52/0229* (2013.01);
(Continued)

(58) Field of Classification Search
CPC ... H04W 80/04; H04W 84/102; H04W 52/02; H04W 76/04
See application file for complete search history.

(56) References Cited

U.S. PATENT DOCUMENTS 7,583,985 B2 9/2009 Matson et al.
8,307,231 B2 11/2012 Radulescu et al.
(Continued)

FOREIGN PATENT DOCUMENTS

JP 2012169970 A 9/2012

OTHER PUBLICATIONS

Fischer M., et al., (BROADCOM): "Target WakeTime; 11-12-0823-00-00ah-targetwaketime", IEEE SA Mentor; 11-12-0823-00-00AH-Targetwaketime, IEEE-SA Mentor, Piscataway, NJ USA, vol. 802. 11ah, Jul. 16, 2012 (Jul. 16, 2012), pp. 1-16, XP068039343, [retrieved on Jul. 16, 2012].
(Continued)

*Primary Examiner* — Andrew Lee
(74) *Attorney, Agent, or Firm* — Sayed H. Beladi

(57) ABSTRACT

Methods and apparatuses for wireless communications are disclosed. In one aspect, an apparatus for wireless communications includes a receiver configured to wirelessly receive a message comprising a time for the apparatus to wake up and instructions to execute an action in response to receiving a paging frame from a wireless communication device. The receiver is further configured to receive the paging frame from the wireless communication device. The apparatus further includes a processor configured to execute the action in response to receiving the paging frame. In one implementation, receiving the paging frame comprises comparing an address of the paging frame with an address of the apparatus. The action may include one or more of sending a power save poll frame, waiting for packet reception, receiving the beacon, and receiving the delivery traffic indication message beacon.

37 Claims, 12 Drawing Sheets

Related U.S. Application Data

(60) Provisional application No. 61/759,350, filed on Jan. 31, 2013.

(51) Int. Cl.
    *H04W 68/02*          (2009.01)
    *H04W 76/04*          (2009.01)

(52) U.S. Cl.
    CPC ........ *H04W 68/02* (2013.01); *H04W 52/0206* (2013.01); *H04W 76/048* (2013.01); *H04W 84/12* (2013.01); *Y02B 60/50* (2013.01)

(56) References Cited

U.S. PATENT DOCUMENTS

| | | |
|---|---|---|
| 8,660,548 B1 | 2/2014 | Lambert |
| 2002/0123345 A1 | 9/2002 | Mahany et al. |
| 2007/0008915 A1 | 1/2007 | Kim et al. |
| 2008/0014882 A1 | 1/2008 | Tsai et al. |
| 2008/0268880 A1 | 10/2008 | Ong et al. |
| 2011/0074552 A1 | 3/2011 | Norair et al. |
| 2012/0120859 A1 | 5/2012 | Stephens et al. |
| 2012/0163259 A1 | 6/2012 | Yang et al. |
| 2012/0264473 A1 | 10/2012 | Mujtaba et al. |
| 2013/0109391 A1 | 5/2013 | Lee et al. |
| 2013/0272137 A1 | 10/2013 | Kwon et al. |
| 2013/0272182 A1 | 10/2013 | Li et al. |
| 2014/0051476 A1 | 2/2014 | Chawla et al. |
| 2014/0086209 A1 | 3/2014 | Su et al. |
| 2014/0112225 A1 | 4/2014 | Jafarian et al. |
| 2014/0133393 A1 | 5/2014 | Ghosh et al. |
| 2014/0192713 A1 | 7/2014 | Park et al. |
| 2014/0204822 A1 | 7/2014 | Park et al. |
| 2014/0211678 A1 | 7/2014 | Jafarian et al. |

OTHER PUBLICATIONS

International Search Report and Written Opinion—PCT/US2014/014039—ISA/EPO—Apr. 22, 2014.

Merlin S., et al., (QUALCOMM): "Very low energy paging; 11-12-1324-00-00ah-very-low-energy-paging", IEEE SA Mentor; 11-12-1324-00-00AH-VERY-L0W-ENERGY-PAGING, IEEE-SA Mentor, Piscataway, NJ USA, vol. 802.11ah, Nov. 12, 2012 (Nov. 12, 2012), pp. 1-15, XP068040170, [retrieved on Nov. 12, 2012].

Park M., (INTEL): "Specification framework for TGah; 11-11-1137-13-00ah-specification-framework-for-tgah", IEEE SA Mentor; 11-11-1137-13-00AH-SPECIFICATION-FRAMEWORK USA, vol. 802.11ah, No. 13, Jan. 16, 2013 (Jan. 16, 2013), pp. 1-58, XP068037178, [retrieved on Jan. 16, 2013].

Proposed NDP Paging Frame Format

1 MHz SIG Field of NDP Synch Frame

| Field | # of Bits |
|---|---|
| CRC | 4 |
| Tail | 6 |
| MAC-NDP | 1 |
| Type | 3-4 TBD |
| P_ID | 9 |
| Check beacon | 1 |
| Partial TSF | 6 |
| More NDP | 1 |
| UL/DL | 1 |
| Reserved | 4-5 TBD |
| Total | 36 |

21-22 bits (P_ID through Reserved)

| IEID | Length | Control Field | Request Type | Target Wake Time | TWT Group Assignment | Nominal Minimum Wake Duration | Wake Interval Mantissa | TWT Channel | NDP Paging |
|---|---|---|---|---|---|---|---|---|---|
| 1B | 1B | 1B | 2B | 8B | 3B | 2B | 2B | 1B | 3B |

| Group ID | Zero Offset of Group | TWT Unit | Increment within Group |
|---|---|---|---|
| 1B | 1B | 1B | 1B |

1643, 1644, 1645, 1646 — 1642

METHODS AND APPARATUS FOR LOW POWER WAKE UP SIGNAL AND OPERATIONS FOR WLAN

CROSS REFERENCE TO RELATED APPLICATIONS

This application is a continuation of U.S. application Ser. No. 14/167,723, titled "METHODS AND APPARATUS FOR LOW POWER WAKE UP SIGNAL AND OPERATIONS FOR WLAN," filed Jan. 29, 2014, which claims the benefit of U.S. Provisional Application No. 61/759,350, titled "SYSTEMS AND METHODS FOR LOW POWER WAKE UP SIGNAL AND OPERATIONS FOR WLAN," filed Jan. 31, 2013. The above applications are hereby incorporated by reference in their entirety.

BACKGROUND

Field

The present application relates generally to wireless communications, and more specifically to methods and apparatuses to enable wireless communication. Certain aspects herein relate to low power wake up signals and operations for WLAN.

Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

SUMMARY

The methods and apparatus of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include providing wireless communication in sub-gigahertz bands for low power and long distance wireless communications.

One aspect of the disclosure provides an apparatus for wireless communications. The apparatus includes a receiver configured to wirelessly receive a message comprising a time for the apparatus to wake up and instructions to execute an action in response to receiving a paging frame from a wireless communication device. The receiver is further configured to receive the paging frame from the wireless communication device. The apparatus further includes a process configured to execute the action in response to receiving the paging frame.

Another aspect of the disclosure provides a method of wireless communication. The method includes wirelessly receiving a message comprising a time for the apparatus to wake up and instructions to execute an action in response to receiving a paging frame from a wireless communication device. The method further comprises receiving the paging frame from the wireless communication device. The method further comprises executing the action in response to receiving the paging frame.

Yet another aspect of the disclosure provides an apparatus for wireless communications. The apparatus includes means for wirelessly receiving a message comprising a time for the apparatus to wake up and instructions to execute an action in response to receiving a paging frame from a wireless communication device. The apparatus further comprises means for receiving the paging frame from the wireless communication device. The apparatus further comprises means for executing the action in response to receiving the paging frame.

BRIEF DESCRIPTION OF THE DRAWINGS

FIG. 12 illustrates one example of a NDP (null data packet) paging frame format, in accordance with aspects of the present disclosure.

FIG. 14A shows a structure of an exemplary TWT information element used to determine a TWT NDP in accordance with an embodiment of the invention.

FIG. 14B shows a structure of an exemplary TWT group assignment field 1642 from FIG. 14A in accordance with an embodiment of the invention.

DETAILED DESCRIPTION

Figure 1:
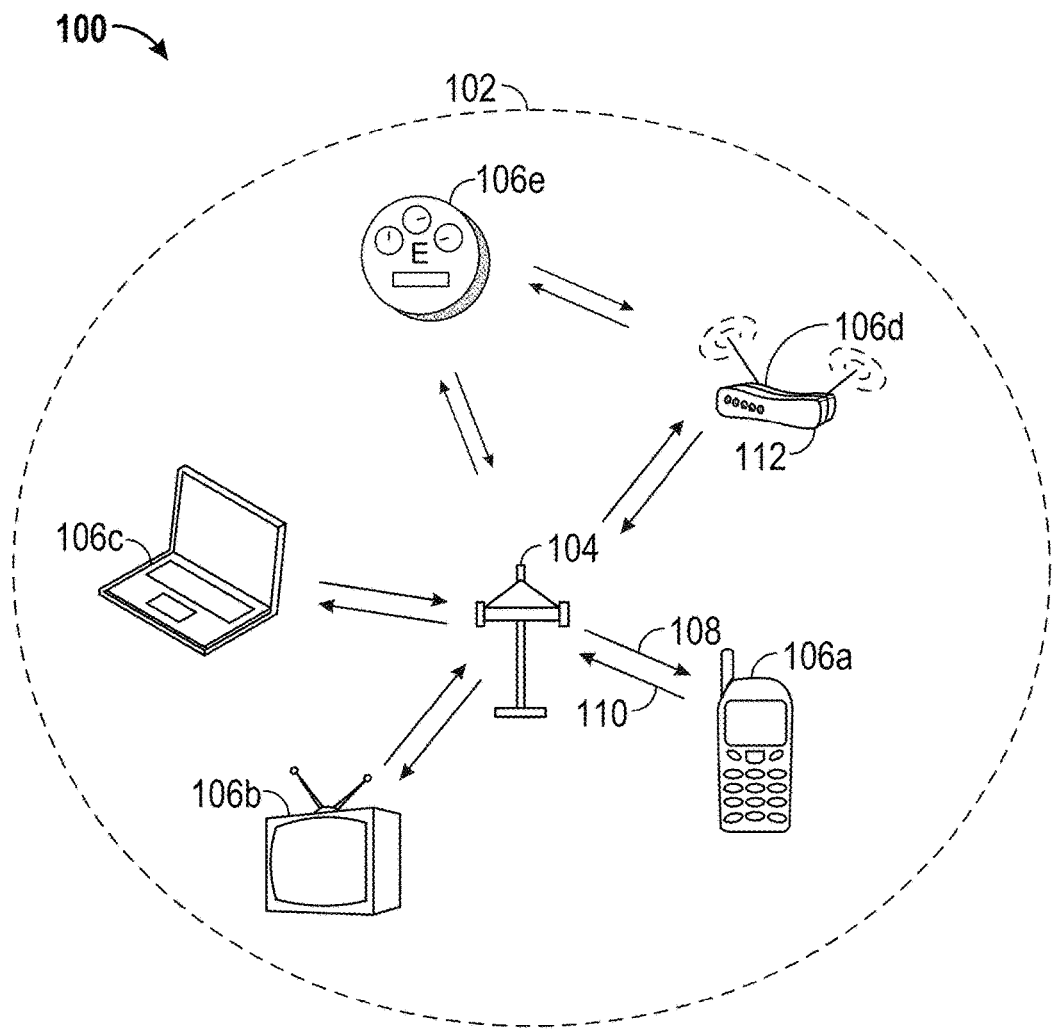
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols. For example, the various aspects described herein may interoperate with or be used as part of the IEEE 802.11ah protocol, which may use sub-1 GHz bands. However, it should be appreciated that a wide variety of other bands and wireless protocols are contemplated by the embodiments described herein.

In some aspects, wireless signals in a sub-gigahertz band may be transmitted according to the 802.11 protocol using orthogonal frequency-division multiplexing (OFDM), direct-sequence spread spectrum (DSSS) communications, a combination of OFDM and DSSS communications, or other schemes. Implementations described herein may be used for sensors, metering, and smart grid networks. Advantageously, aspects of certain embodiments may include wireless devices that may consume less power than devices implementing other wireless protocols, and/or may be used to transmit wireless signals across a relatively long range, for example about one kilometer or longer. These devices may be configured to operate on power provided by energy storage devices and may be configured to operate without replacing the energy storage device for long periods of time (e.g., months or years).

Certain of the devices described herein may further implement Multiple Input Multiple Output (MIMO) technology. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min\{N_T, N_R\}$. Each of the Ns independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Devices described herein, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example an 802.11 standard. The wireless communication system 100 may include an AP 104, which communicates with STAs 106a, 106b, 106c, 106d, and 106e (collectively STAs 106).

STA 106e may have difficulty communicating with the AP 104 or may be out of range and unable to communicate with the AP 104. As such, another STA 106d may be configured as a relay 112 that relays communications between the STA 106e and the AP 104.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
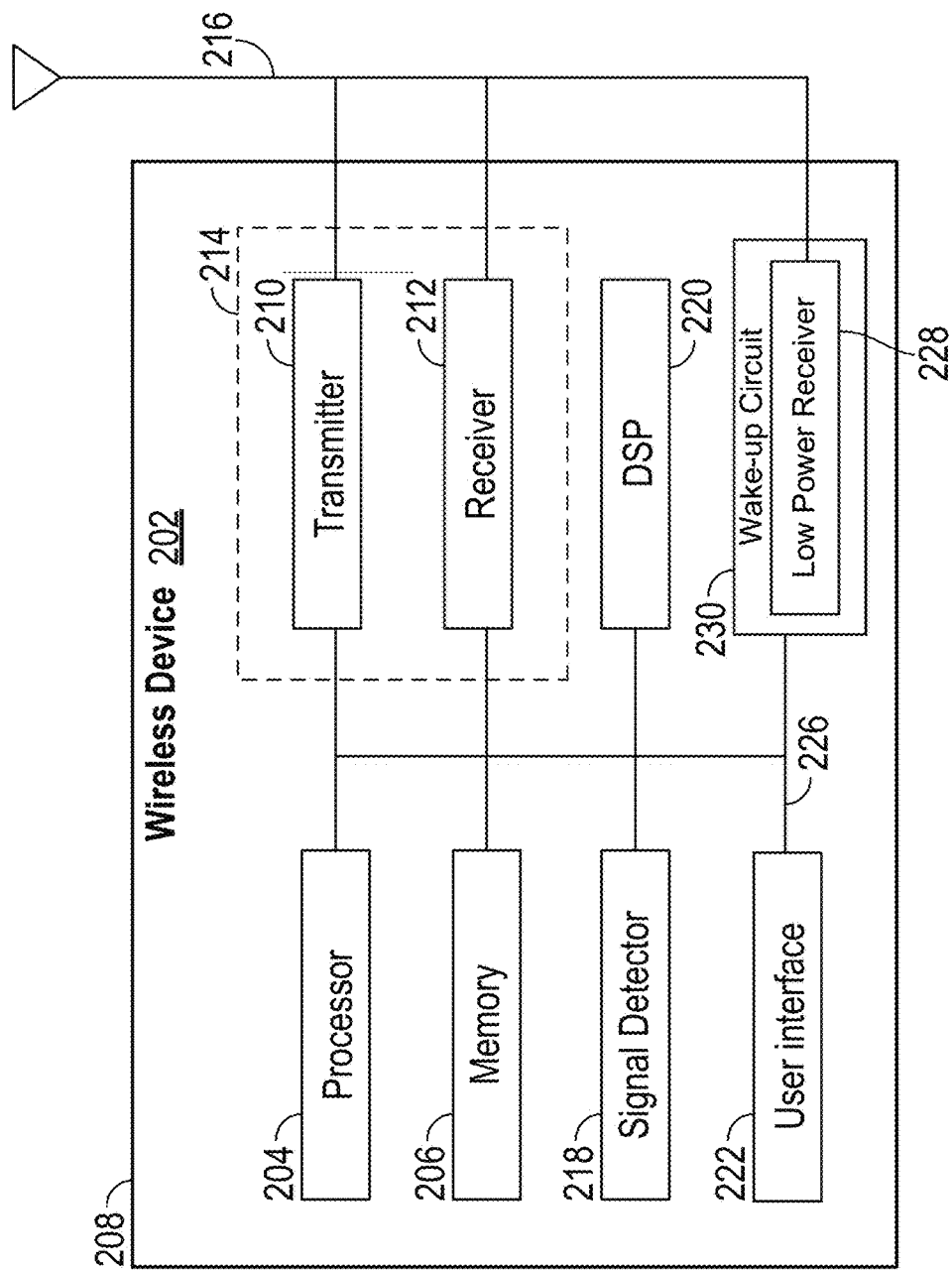
FIG. 2 shows a functional block diagram of an exemplary wireless device that may be employed within the wireless communication system of FIG. 1, in accordance with an exemplary embodiment of the invention.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104, or one of the STAs 106 of FIG. 1.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the wireless device 202 is implemented or used as a transmitting node, the processor 204 may be configured to select one of a plurality of media access control (MAC) header types, and to generate a packet having that MAC header type. For example, the processor 204 may be configured to generate a packet comprising a MAC header and a payload and to determine what type of MAC header to use, as discussed in further detail below.

When the wireless device 202 is implemented or used as a receiving node, the processor 204 may be configured to process packets of a plurality of different MAC header types. For example, the processor 204 may be configured to determine the type of MAC header used in a packet and process the packet and/or fields of the MAC header accordingly as further discussed below.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different MAC header types. For example, the transmitter 210 may be configured to transmit packets with different types of headers generated by the processor 204, discussed above.

The receiver 212 may be configured to wirelessly receive packets having different MAC header type. In some aspects, the receiver 212 is configured to detect a type of a MAC header used and process the packet accordingly, as discussed in further detail below.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a wake up circuit 230 comprising a second, low power receiver 228. In one aspect, the low power receiver 228 may be configured to consume power that is lower than power normally consumed by the receiver 214 during operation. For example, the low power receiver 228 may be configured to consume on the order of 10×, 20×, 50× or 100× (or more) less power when operating as compared to the transceiver 214. In one aspect, the low power receiver 228 may be configured to receive signals using modulation/demodulation techniques such as on-off keying or frequency-shift keying (FSK) as compared to the transceiver 214 that may be configured to transmit and receive signals based on OFDM and other comparable techniques. A STA 106 that is a wireless device 202 having the low power receiver 228 may be referred to herein as a low power receiver STA 106e. Other STAs that may not include the low power receiver 228 or may be operating in a mode where the transceiver 214 is activated may be referred to herein as a STA 106.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. Furthermore, the processor 204 may be used to implement any of the components, modules, circuits, or the like described below, or each may be implemented using a plurality of separate elements.

For ease of reference, when the wireless device 202 is configured as a transmitting node, it is hereinafter referred to as a wireless device 202t. Similarly, when the wireless device 202 is configured as a receiving node, it is hereinafter referred to as a wireless device 202r. A device in the wireless communication system 100 may implement only functionality of a transmitting node, only functionality of a receiving node, or functionality of both a transmitting node and a receive node.

Figure 3:
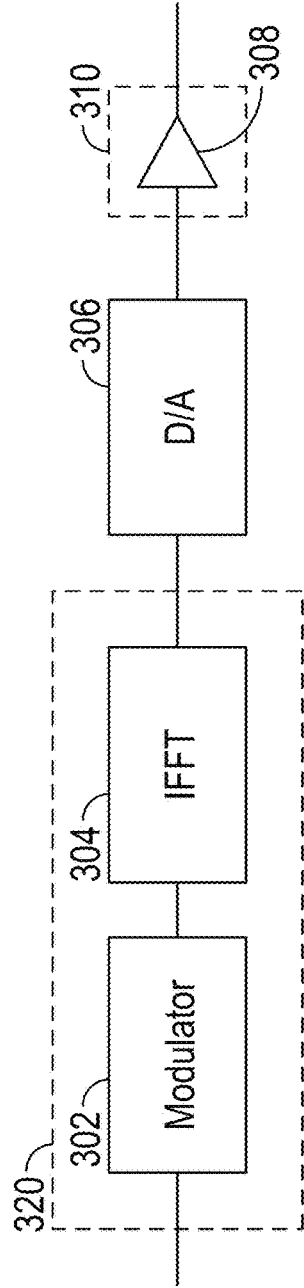
FIG. 3 shows a functional block diagram of exemplary components that may be utilized in the wireless device of FIG. 2 to transmit wireless communications, in accordance with an exemplary embodiment of the invention.

As discussed above, the wireless device 202 may comprise an AP 104, a STA 106, or a low power receiver STA 106e. FIG. 3 illustrates various components that may be utilized in the wireless device 202t to transmit wireless communications. The components illustrated in FIG. 3 may be used, for example, to transmit OFDM communications.

The wireless device 202t of FIG. 3 may comprise a modulator 302 configured to modulate bits for transmission. For example, the modulator 302 may determine a plurality of symbols from bits received from the processor 204 (FIG. 2) or the user interface 222 (FIG. 2), for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 202t may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes. In some implementations, the transform module 304 may be itself configured to transform units of data of different sizes. For example, the transform module 304 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 304 may be referred to as the size of the transform module 304. It should be appreciated that the transform module 304 may be configured to operate according to additional modes where 128 points, 256 points, 512 points, and 1024 points are used, and the like.

In FIG. 3, the modulator 302 and the transform module 304 are illustrated as being implemented in the DSP 320. In some aspects, however, one or both of the modulator 302 and the transform module 304 are implemented in the processor 204 or in another element of the wireless device 202t (e.g., see description above with reference to FIG. 2).

As discussed above, the DSP 320 may be configured to generate a data unit for transmission. In some aspects, the modulator 302 and the transform module 304 may be configured to generate a data unit comprising a plurality of fields including control information and a plurality of data symbols.

Returning to the description of FIG. 3, the wireless device 202t may further comprise a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202 of FIG. 2. In some aspects, the digital to analog converter 306 is implemented in the transceiver 214 (FIG. 2) or in a data transmit processor.

The analog signal may be wirelessly transmitted by the transmitter 310. The analog signal may be further processed before being transmitted by the transmitter 310, for example by being filtered or by being upconverted to an intermediate or carrier frequency. In the aspect illustrated in FIG. 3, the transmitter 310 includes a transmit amplifier 308. Prior to being transmitted, the analog signal may be amplified by the transmit amplifier 308. In some aspects, the amplifier 308 comprises a low noise amplifier (LNA).

The transmitter 310 is configured to transmit one or more packets or data units in a wireless signal based on the analog signal. The data units may be generated using the processor 204 (FIG. 2) and/or the DSP 320, for example using the modulator 302 and the transform module 304 as discussed above. Data units that may be generated and transmitted as discussed above are described in additional detail below.

Figure 4:
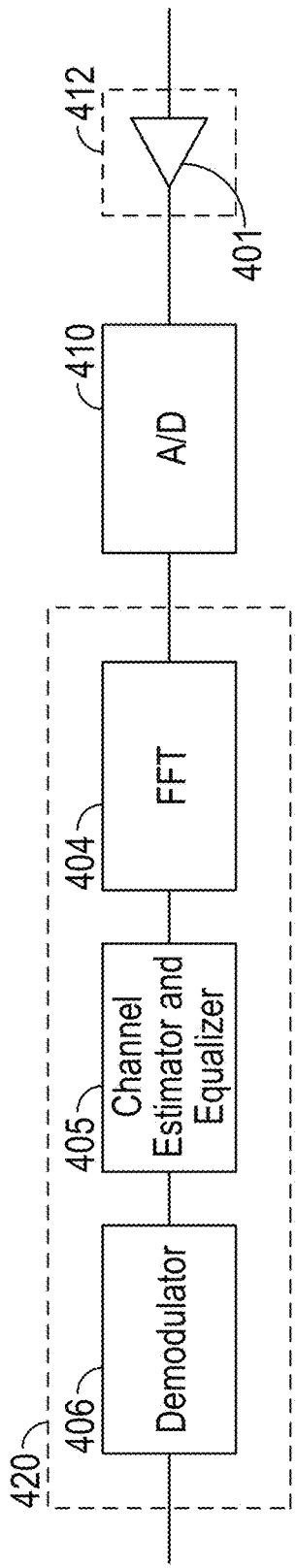
FIG. 4 shows a functional block diagram of exemplary components that may be utilized in the wireless device of FIG. 2 to receive wireless communications, in accordance with an exemplary embodiment of the invention.

FIG. 4 illustrates various components that may be utilized in the wireless device 202 of FIG. 2 to receive wireless communications. The components illustrated in FIG. 4 may be used, for example, to receive OFDM communications. In some aspects, the components illustrated in FIG. 4 are used to receive data units over a bandwidth of equal to or less than 1 MHz. For example, the components illustrated in FIG. 4 may be used to receive data units transmitted by the components discussed above with respect to FIG. 3.

The receiver 412 of wireless device 202b is configured to receive one or more packets or data units in a wireless signal. Data units that may be received and decoded or otherwise processed as discussed below.

In the aspect illustrated in FIG. 4, the receiver 412 includes a receive amplifier 401. The receive amplifier 401 may be configured to amplify the wireless signal received by the receiver 412. In some aspects, the receiver 412 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The wireless device 202r may comprise an analog to digital converter 410 configured to convert the amplified wireless signal from the receiver 412 into a digital representation thereof. Further to being amplified, the wireless signal may be processed before being converted by the digital to analog converter 410, for example by being filtered or by being downconverted to an intermediate or baseband frequency. The analog to digital converter 410 may be implemented in the processor 204 (FIG. 2) or in another element of the wireless device 202r. In some aspects, the analog to digital converter 410 is implemented in the transceiver 214 (FIG. 2) or in a data receive processor.

The wireless device 202r may further comprise a transform module 404 configured to convert the representation of the wireless signal into a frequency spectrum. In FIG. 4, the transform module 404 is illustrated as being implemented by a fast Fourier transform (FFT) module. In some aspects, the transform module may identify a symbol for each point that it uses. As described above with reference to FIG. 3, the transform module 404 may be configured with a plurality of modes, and may use a different number of points to convert the signal in each mode. For example, the transform module 404 may have a mode where 32 points are used to convert a signal received over 32 tones into a frequency spectrum, and a mode where 64 points are used to convert a signal received over 64 tones into a frequency spectrum. The number of points used by the transform module 404 may be referred to as the size of the transform module 404. In some aspects, the transform module 404 may identify a symbol for each point that it uses. It should be appreciated that the transform module 404 may be configured to operate according to additional modes where 128 points, 256 points, 512 points, and 1024 points are used, and the like.

The wireless device 202b may further comprise a channel estimator and equalizer 405 configured to form an estimate of the channel over which the data unit is received, and to remove certain effects of the channel based on the channel estimate. For example, the channel estimator 405 may be configured to approximate a function of the channel, and the channel equalizer may be configured to apply an inverse of that function to the data in the frequency spectrum.

The wireless device 202t may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204 (FIG. 2), or used to display or otherwise output information to the user interface 222 (FIG. 2). In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 420. In some aspects, however, one or more of the transform module 404, the channel estimator and equalizer 405, and the demodulator 406 are implemented in the processor 204 (FIG. 2) or in another element of the wireless device 202 (FIG. 2).

As discussed above, the wireless signal received at the receiver 212 comprises one or more data units. Using the functions or components described above, the data units or data symbols therein may be decoded evaluated or otherwise evaluated or processed. For example, the processor 204 (FIG. 2) and/or the DSP 420 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized.

The wireless device 202a shown in FIG. 3 shows an example of a single transmit chain to be transmitted over an antenna. The wireless device 202b shown in FIG. 4 shows an example of a single receive chain to be received over an antenna. In some implementations, the wireless device 202a or 202b may implement a portion of a MIMO system using multiple antennas to simultaneously transmit data.

Accordingly, certain implementations are directed to sending wireless signals using a variety of different bandwidths in different frequency ranges. For example, in one exemplary implementation, a symbol may be configured to be transmitted or received using a bandwidth of 1 MHz. The wireless device 202 of FIG. 2 may be configured to operate in one of several modes. In one mode, symbols such as OFDM symbols may be transmitted or received using a bandwidth of 1 MHz. In another mode, symbols may be transmitted or received using a bandwidth of 2 MHz. Additional modes may also be provided for transmitting or receiving symbols using a bandwidth of 4 MHz, 8 MHz, 16 MHz, and the like. The bandwidth may also be referred to as the channel width. In addition, additional modes or configuration are possible such as for example of using bandwidths of 20 MHz, 40 MHz, 80 MHz, and the like in the 2.4 GHz band or the 5 GHz. Band.

In a STA 106, a significant source of power consumption may be due to the long time spent by the STA 106 in receive mode, either during packet reception and especially during the time a receiver is on and waiting to receive a packet. In battery operated STAs, transmit power may be comparable to receive power, but receive time may be much longer than transmit time. Particularly when operating using a battery, it is desirable to reduce the awake time of STAs to reduce power consumption. One way to reduce the awake time of a STA 106 is to turn off the STA receiver 212 for a majority of a time interval except for certain short intervals of time. In this case, the transmitter 210 and receiver 212 may be controlled such that an on/off cycle of the transmitter 210 and receiver 212 is coordinated. In some cases, this may not be flexible or efficient. For example, in typical applications, the traffic pattern may not be predictable. In addition, the agreed awake time may not match the traffic pattern so some awake times may be useless. In addition, the traffic may come at times where STA 106 is off and there may be no way to deliver the packet until the STA 106 wakes up.

In an embodiment, a low power receiver 228 as described above may be provided in a low power receiver STA 106e. In one aspect, the low power receiver STA 106e may communicate with an AP 104. In this case, there may be an association (e.g., registration) procedure where certain information is exchanged between the low power receiver STA 106e and the AP 104 to determine future communication parameters and activities. In another aspect, the low power receiver STA 106e may communicate between other STAs that are not associated with each other.

In one aspect, the low power receiver 228 may remain on substantially indefinitely while the low power receiver STA 106e is in operation. In another aspect, the low power "wake up" receiver 228 may operate according to an on/off duty cycle as defined by a given schedule, to further reduce energy consumption. For example, the processor 204 or a controller (not shown) may regulate the schedule. Furthermore, the processor 204 may be configured to otherwise control when the low power receiver 228 listens for the wake up signal for different durations and time periods (e.g., awake periods for example during business hours as compared to other sleep periods).

According to an embodiment, to maximize sleep, the transceiver 214, analog and digital, may be configured to be off (e.g., powered down). The only circuit that is powered is the RF wake up circuit 230. The low power receiver 228 of the RF wake up circuit 230 may listen for a particular RF signal structure. When detected, the RF wake up circuit 230 turns on or otherwise activates the transceiver 214. In some cases, the transceiver 214 and modem may take ~100-200 us to wake up (assuming transceiver 214 stays powered). The wake up time may be a function of PLL convergence time, loading of calibration coefficients, and other register loading. In some cases, wake up time may be as large as ~2 ms if transceiver 214 is fully powered off as well. Thus, in one aspect, the wake up packet may reserve a wireless medium for a time period for the transceiver 214 to wake up and start receiving data and include the special RF signal structure.

In some embodiments, a low power receiver STA 106e may not be associated with other STAs. For examples the low power receiver STA 106e and other STAs may not be associated with an AP and their interaction with each other is based on events and temporary proximity (e.g., asynchronous operation). For example, in a building, a battery operated small sensor is placed in each room. Each sensor may be configured as a low power receiver STA 106e. As described above, the transceiver 214 of the STA 106e is normally off, to save power. In one example, a smartphone, configured as a STA 106, is brought into the building and wants to interact with the sensor STA 106e, e.g., to discover its location or issue a command. The smartphone STA 106 issues a low power wake up signal. A neighboring sensor STAs 106e may be configured to detect the low power wake up signal using the wake up circuit 230 and activate or turn on the transceiver 214 (radio). Either the sensor STA 106e proactively sends a packet indicating the location, or the sensor STA 106e waits for reception of a packet from the smartphone STA 106 to determine which action to take.

The wake up circuit 230 may be configured to operate according to several modes. For example, in a first mode the low power receiver 228 is always on and waiting to receive a wake up packet. This may ensure fastest response but results in higher power consumption. In another mode, the low power wake up receiver 228 is not always on and may operate according to a wake up duty cycle. The wake up duty cycle may be adapted to tolerable interaction delay. In some cases, the wake up signal may therefore be sent multiple times to find the receiver in the ON state.

In other embodiments a low power receiver STA 106e may be associated with an AP 104. As such, in one aspect, the low power receiver STA 106e interaction is with the AP 104 and can exploit cooperation with the AP 104 (e.g., synchronous operation is possible). For example, when associated there may be ways to enhance existing power save modes. For example, in a power save mode, a low power receiver STA 106e may wake up to receive beacons. The beacon indicates if the low power receiver STA 106e needs to stay awake further to receive downlink data (e.g., paged). In addition, there may be enhancement with low power wakeup receiver 228 where the AP 104 sends a low power wake up signal before the beacon, indicating whether the low power receiver STA 106e is (or may be) paged in the beacon. If the low power receiver STA 106e will not be paged, or is unlikely to be paged, the low power receiver STA 160e need not turn on the transceiver 214 to receive the beacon to save power. In these cases, the low power receiver 228 may need to be on at least some time before the beacon, to receive the wake up signal.

In addition, by using association there may be benefits based on traffic assumption. For example as there may be a low probability of downlink data, the low power receiver STA 106e may go to sleep most of the times after the low power wake up signal. In addition, there may be benefits in the case of long sleep time and large clock drift where the low power wake up signal indicates when a beacon is coming. The low power receiver STA 1063 need not turn on the transceiver 214 until that time.

The RF low power wake up signal may be transmitted on the same channel as other data signals. For example, the low power wake up signal may be transmitted on the same channel as Wi-Fi data signals. As such, coexistence with the other data is provided. More particularly, coexistence with Wi-Fi signals may be provided. In one aspect, various considerations may be taken into account for providing coexistence. For example, a wake up signal may have narrower bandwidth than a Wi-Fi signal. In addition, there may be regulatory limitations on how narrowband the wakeup signal can be which may imply a limit on the sensitivity/range. The low power receiver STAs 106e may be power constrained and likely using low transmit power themselves. As such, for STAs 106e in an associated state (e.g., likely to be close to the AP 104), the downlink link budget may be several dB better than the uplink one. Furthermore, it may be acceptable that the sensitivity of low wake up receiver 228 is up to ~20 dB worse than the regular receiver. For non-associated STAs, for proximity application (e.g. location tags, non-associated scenario) the applications may require less sensitivity, because the range may be less important.

In general, the wake up signal may trigger one or more behaviors at recipient STAs. For example, among other behaviors, in response to receiving the wake up signal, a STA may turn on the WiFi receiver, turn OFF the ULP receiver, and/or perform a specific command, with or without turning on the WiFi receiver. For example, a STA may turn on a related actuator, send a PS-Poll/ACK, and/or read the beacon with or without turning on the WiFi receiver.

The Behavior may be inherent in the reception of the wake up signal, or may be explicitly conveyed in the wake up signal. If Inherent, the behavior may in response to the mere reception of the wake up signal at the intended STA. The behavior upon reception may be configured with a WiFi management exchange between the STA and the AP. For example, the AP may assign a behavior, such as to wake up or to sleep, for the STA upon future receipt of a wake up signal. If a command is explicitly indicated in the packet, command modification bits may be used.

For example, certain bits in the ULP message, or wake up signal, may indicate a specific action that the receiver is to take upon reception. If X bits are allocated for command, 2x commands are possible. Some commands may be explicitly defined by the telecommunication protocol specification. Some or most of the 2x command values may be left undefined. They may, for example act as a 'Payload' of the ULP packet and their meaning may be out of the scope of standardization.

One or more bits may indicate a type of packet, message, or command One or more types can be left open, for example, for vendor specification. One or more bits may indicate the command.

The specific commands are not limited, and may include standardized commands, such as: wakeup, wakeup and send PS-Poll, wakeup and send PS-Poll in a pre-determined time, wakeup and read the beacon, wakeup and send an ACK when possible, back to doze or sleep, grant for UL transmission without contention, a generic ON/OFF command Other commands may be additionally or alternatively used.

In some embodiments the frame of the wake up signal may include multiple addresses. In alternative embodiments the frame may not include any address at all. For example, the AP wakes up all the STAs that are on ULP-awake mode in a given time. The AP can associate a time interval to ULP enabled STAs, divide the time interval into different slots, and assign each slot to one or more STAs. The AP can wake up particular STAs by transmitting a ULP wakeup signal in the time slot assigned to the particular STAs.

The particular type of address is not limited, and may be included in the wake up signal. In some embodiments the address may be a ULP-ID. For example, the ULP-ID may be a (partial) unicast AID (PAID). In some embodiments, multiple ULP-IDs may be assigned to a single STA. The ULP-ID may be a group ID. For example, the AP may assign the ULP-ID to multiple STAs. In some embodiments the AP is in charge of assigning ULP-IDs and creating groups. In some embodiments algorithms for such assignments are not included in the standard specification, and may depend on implementation. In some embodiments, the ULP-ID includes a partial identifier of the BSS. In some embodiments, a common broadcast ULP-ID is assigned to all STAs associated with the AP.

Management frames may be defined for the assignment of the ULP-IDs. At association or later when requesting the use of ULP, a STA may also implicitly request to be assigned a ULP-ID. Depending on the definition of ULP-ID, assignment may be implicitly defined. For example the ULP-ID of a STA may be a function of the STA's AID and/or BSSID or MAC address.

If the ULP-ID is not implicit, the AP may, in the response granting the use of PS-ULP mode, also indicate one or more ULP-IDs or ULP-group-IDs. If the STA has no ULP-ID, the AP may convey the information about the assigned ULP-slot for the STA implicitly (e.g., computed from group-ID or AID) or explicitly (e.g., in a management frame or at the time of association).

As discussed above, non-associated STAs may transmit or receive ULP wake up signals. These STAs do not have an AID as they are not associated with an AP. A global ID may be used to indicate the address of the non-associated STA to be woken up. Alternatively, the ULP-ID for the non-associated STA may be based on the type of STA, where the type may depend on a characteristic of the STA, such as vendor or function. In some embodiments, the ULP-ID for the non-associated STA may be based on the type of traffic or QoS. In some embodiments, the ULP-ID for the non-associated STA may be a function of the full MAC address of the non-associated STA. Alternatively, the ULP-ID may be provided by an application or by a user.

As discussed above, command modification bits may be included in or with the wake up signal to specify one or more commands to be executed in response to the STA receiving the wake up signal. The following non-limiting examples of command modification bits and associated definitions or functionality may be used in various implementations, and in various combinations.

X1 bits may be used to indicate how many more ULP signals will follow this signal. This information, may, for example, be used by a STA to determine that the AP having sent the wake up signal is going to be busy for a certain time following the receipt of the wake up signal. For example, if 2 X1 bits are used, and there are two more signals following the current ULP signal, the X1 bits may indicate 10. If n X1 bits are used, and more than $2^n-1$ signals follow, the X1 bits indicate $2^n-1$. In the case that 1 X1 bit is used the X1 bit indicates whether additional ULP signals follow.

X2 bits may be used to show the behavior of the AP after sending the ULP signal. For example, X2 bits may indicate whether the AP will send an ACK or is unable to receive uplink packets in a period of time.

X3 bits may be used to convey time synch information, such as the timestamp, or a number of bits of the timestamp at the AP. This may be important since time drifting at the STA has a significant effect on power consumption. In some embodiments, the time of the transmitted ULP signal can give some information about the timestamp, and some part of the timestamp can be calculated or determined from the X3 bits.

X4 bits may be used to indicate the structure or contents of the ULP signal. For example, the X4 bits may indicate how many bits of the timestamp the wake up signal contains. In some embodiments, X4 bits are used to specify or modify the definitions of other X bits.

X5 bits may be used to indicate information about the other STAs. For example, the X5 bits may indicate how many wake up signals follow for other STAs, so that the STA can start contenting for the medium.

X6 bits may be used to indicate any encoding modes of the ULP signal.

X7 bits may be used to indicate particular information that is generally found in a beacon or a management frame. In such embodiments, the STA can receive the information via the ULP signal without reading the beacon or management frame.

X8 bits may be used to indicate how late or delayed the ULP signal is from the AP as compared with an expected time for the ULP signal. In some embodiments, the STA can synch its clock with this information X9 bits may be used to indicate how many STAs are the ULP signal is intended for.

X10 bits may be used to include information about the medium or PHY parameters. For example, PHY encoding, a NAV, or a medium busy time, may be communicated with X10 bits.

X11 bits may be used to indicate what type the ULP signal is. For example, the ULP signal can be for awakening a STA or for synchronizing only, or the ULP signal may include some general information about all the STAs that receive the signal. In some embodiments, X11 bits are used to specify or modify the definitions of other X bits.

X12 bits may be used to indicate a change in ULP signal protocol or definition for a next ULP signal. In some embodiments X12 bits indicate how many ULP signals will follow having the changed protocol or definition or may indicate that the change is permanent or until further specified. X12 bits may specify PHY changes for the ULP signal, or MAC changes. For example, the time designation for a ULP slot may be changed, or the protocol or sequence of the wakeup signaling may be changed.

Any superset or subset of X1-X12 bits may be included in a ULP signal and which subset is included may be indicated in the signal itself. For example, X4 bits may always be present in the ULP signal which indicate the structure of the signal and what is included in the signal.

In some embodiments, the wake up signal is included in a PHY preamble, such as an 802.11ah PHY preamble. The wake up signal may be encoded using on/off keying (OOK). In some embodiments, the wake up signal may have a bit allocation as shown in the examples below.

1 MHz SIG Field

| Field | # of bits |
|---|---|
| CRC | 4 |
| Tail | 6 |
| MAC-NDP | 1 |
| Type | 4 |
| P-AID | 6 to 13 |
| Info/reserved | 8 to 15 |
| Total | 36 |

2 MHz SIG Field

| Field | # of bits |
|---|---|
| CRC | 4 |
| Tail | 6 |
| MAC-NDP | 1 |
| Type | 4 |
| P-AID | 8-13 |
| Info/reserved | 20 to 27 |
| Total | 48 |

In some embodiments, a set of orthogonal sequences (e.g. PN) may be used. This may be especially beneficial if only 1 sequence is to be detected, for example, if using a PAID. In some embodiments, the sequence may include an on/off keying (OOK)/amplitude shift keying (ASK)/frequency shift keying (FSK)/complementary code keying (CCK) sequence.

In some embodiments, a fixed synchronization sequence may be used. The fixed synchronization sequence may be followed by coded/spreaded data. This may be especially beneficial because the synchronization preamble may include a single detector with multiple coded bits. In some embodiments, the synchronization sequence may include a OOK/ASK/FSK/CCK synchronization sequence, and may be followed by a low data rate OOK/ASK/CCK data sequence. Optionally a CRC field may also be included.

Figure 5A:
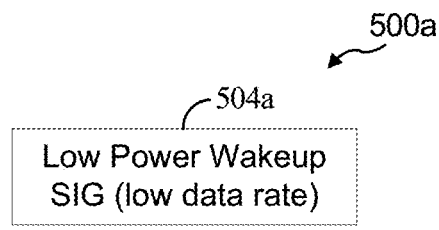
FIG. 5A shows an exemplary low power wake up signal, in accordance with an exemplary embodiment of the invention.

FIG. 5A shows a structure of an exemplary low power wake up signal 500a, in accordance with an embodiment of the invention. For example, the wake up signal 500a may be a single-phase signal 504a that carries an encoded signal. The wake up signal may be transmitted using on-off keying, frequency-shift keying, or the like. For example, if using something similar to on-off keying, the wake up signal 500a may be a sequence represented as zeros and ones. When the wake up circuit 330 and low power receiver 228 detect a particular sequence of zeros and ones, the wake up circuit 330 may trigger the behavior specified by the sequence. The wake up circuit 330 may have multiple correlators to try to detect each possible signal.

Figure 5B:
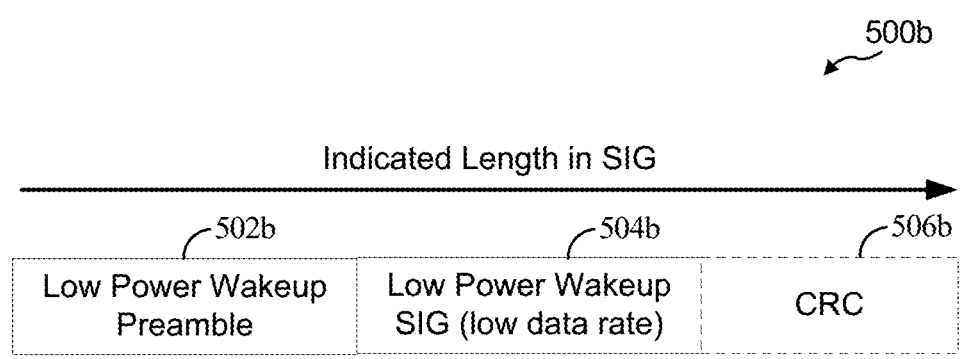
FIG. 5B shows another exemplary low power wake up signal, in accordance with an exemplary embodiment of the invention.

FIG. 5B shows a structure of another exemplary low power wake up signal 500b, in accordance with an embodiment of the invention. The low power wake up signal includes two portions. This first portion 502b includes a 'global' sequence (robust), i.e. like a 'low power wake up preamble.' This may allow the low power receiver 228 to detect that a low power signal 500b is coming up. The second portion 504b, following the first portion 502a, includes encoded information. The encoded information may indicate the identifier of the STA 106e to be woken up or other information. The encoded information may include one or more commands and command modification bits, as discussed above. Optionally, there may be a third portion 506b including a checksum for error detection. The first portion 502b may be formed using an on-off keying, frequency-shift keying, or other modulated preamble sequence that may provide the timing and detection. In some embodiments, the second portion 504b may include data. Spreading/encoding may be agreed by transmitting and receiving STAs.

In some implementations, the low power wake up signal may be provided in a sequence of transmissions that provide for coexistence. For example, an additional 'Wakeup PPDU format' preamble may be provided, such as an new wake up PPDU format for a 802.11 OFDM PHY preamble followed by the new low power wake up signal. The OFDM PHY preamble may indicate a duration (in SIG field) that makes 802.11 STAs defer for the duration of the signal, the wake up time for the receiver, and the duration of any other commands to be executed. The 802.11 STAs may assume there is a regular packet coming up. As such, reception of the payload may fail, but the 802.11 STA defers for the time indicated in PHY preamble. Furthermore, the low power wake up signal may be provided to have up to ~20 ms signaling duration to match the duration of a typical PPDU. In addition, Null Packets (QoS Null frames to the STA) may be sent during the wake up time (e.g., period of time the transceiver 214 of the low power receiver STA 106e needs to be turned on) to make sure other devices honor contention based mechanisms for accessing the channel. In addition, there may be multiple wake up signals protected by a same PHY preamble. In addition, the PHY preamble may have a bandwidth that narrower than an 802.11 preamble. In some implementations, information of the 'Wakeup PPDU format' preamble may be encoded additionally or alternatively within the low power wake up signal.

Figure 6A:
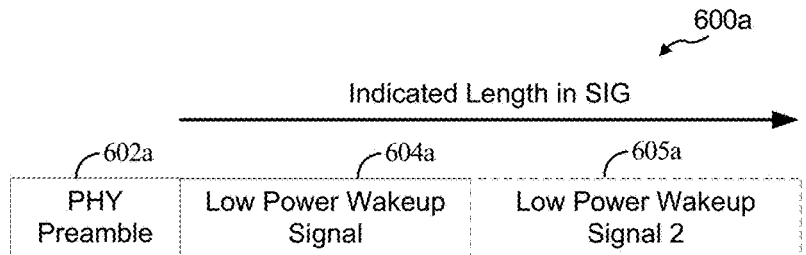
FIGS. 6A, 6B, 6C, and 6D show exemplary signal transmissions for transmitting a low power wake up signal, in accordance with an exemplary embodiment of the invention.

FIG. 6A shows exemplary signal transmissions 600a for transmitting a low power wake up signal, in accordance with an exemplary embodiment of the invention. First a PHY preamble 602a is transmitted. The PHY preamble 602a may be a modified 802.11 PHY preamble as described above. STAs that receive and are able to decode the PHY preamble 602 may be able to obtain information that indicates a period of time to defer access to the wireless communication medium. As shown in FIG. 6A, the time to defer may correspond to the time needed by the transmitting STA 106 or AP 104 to transmit the low power wake up signals to one or more receivers. In one aspect a low power receiver 228 may not be able to decode or detect the preamble 602a. After sending the PHY preamble 602a, a low power wake up signal 604a is transmitted. A low power receiver STA 106e may be able to detect the low power wake up signal 604a, decode any commands and command modification bits in the low power wake up signal 604a, execute the commands according to the information communicated by the command modification bits, and/or execute one or more commands in response to receiving the low power wake up signal, such as activating a transceiver 214 for receiving, for example, OFDM communications. In addition, a second low power wake up signal 605a intended for another low power receiver STA 106e may be transmitted. In some implementations, information of the PHY preamble 602a may be encoded additionally or alternatively within the low power wake up signal.

Figure 6B:
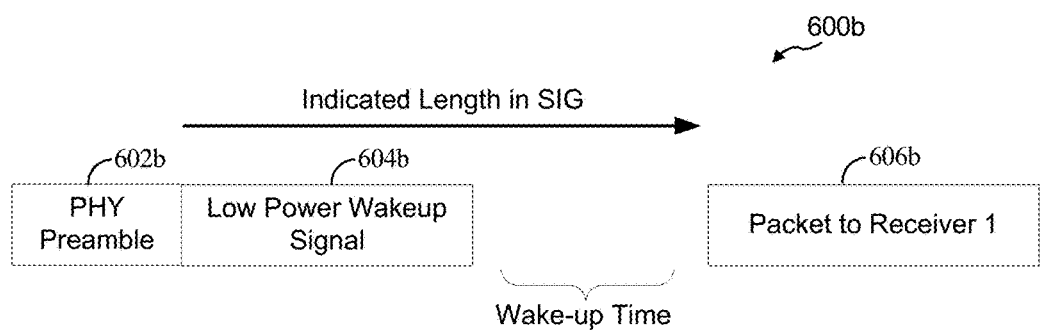

FIG. 6B shows another group of exemplary signal transmissions 600b for transmitting a low power wake up signal, in accordance with an exemplary embodiment of the invention. First a PHY preamble 602b is transmitted as described above with reference to 6A. As shown in FIG. 6B, the time to defer may correspond to the time needed by the transmitting STA 106 or AP 104 to transmit the low power wake up signals to one or more receivers and for a determined period needed for the low power receiver STA 106e to decode and/or execute any commands in the following low power wake up signal, such as activating its transceiver 214. After sending the PHY preamble 602b, a low power wake up signal 604b is transmitted. A low power receiver STA 106e may be able to detect the low power wake up signal 604b and activate a transceiver 214. After a wake up time period after which the low power receiver STA 106e is ready to receive wireless communications, the STA 106 that transmitted the low power wake up signal 604c may send a packet 606b to the low power receiver STA 106e. In some implementations, information of the PHY preamble 602b may be encoded additionally or alternatively within the low power wake up signal.

Figure 6C:
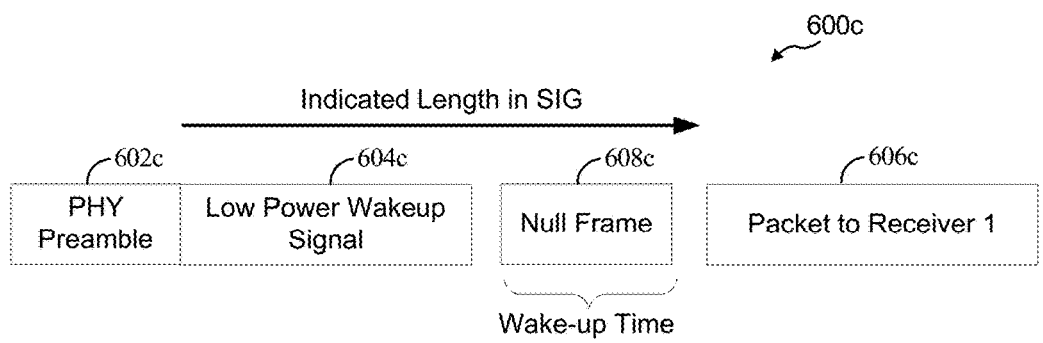

FIG. 6C shows another group of exemplary signal transmissions 600c for transmitting a low power wake up signal, in accordance with an exemplary embodiment of the invention. First a PHY preamble 602c is transmitted as described above with reference to 6A. As shown in FIG. 6C, the time to defer may correspond to the time needed by the transmitting STA 106 or AP 104 to transmit the low power wake up signals to one or more receivers and for a determined wake up period needed for the low power receiver STA 106e to decode and execute any commands in the following low power wake up signal, such as activating its transceiver 214. After sending the PHY preamble 602c, a low power wake up signal 604c is transmitted. A low power receiver STA 106e may be able to detect the low power wake up signal 604c, decode any commands and command modification bits in the low power wake up signal 604a, execute the commands according to the information communicated by the command modification bits, and/or execute one or more commands in response to receiving the low power wake up signal, such as activating a transceiver 214. During the wake up time period, a null frame 608c may be transmitted such that the presence of a signal may be detected on the wireless communications medium. For example, a STA 106 that misses the preamble 602c or that is unable to decode the preamble 602c correctly due to, e.g., a low SNR, may still be able to detect energy on the wireless medium during the null frame 608c and refrain from accessing the medium for the time period. After a wake up time period after which the low power receiver STA 106e is ready to receive wireless communications, the STA 106 that transmitted the low power wake up signal 604c may send a packet 606b to the low power receiver STA 106e. This packet may be received and decoded by the transceiver 214 of the low power receiver STA 106e. In some implementations, information of the PHY preamble 602c may be encoded additionally or alternatively within the low power wake up signal.

Figure 6D:
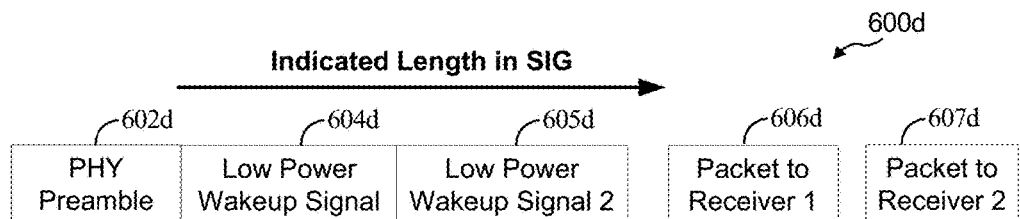

FIG. 6D shows another group of exemplary signal transmissions 600d for transmitting a low power wake up signal, in accordance with an exemplary embodiment of the invention. After transmitting the PHY preamble 602d, two low power wake up signals may be transmitted 604d and 605d to two different low power receiver STAs. Other STAs that are able to decode the preamble 602d may obtain information from the preamble 602d to defer access to the medium during both low power wake up signal transmissions.

In another embodiment, a STA 106 that is transmitting a low power wake up signal may send a CTS-to-self or other frame that sets the network allocation vector (NAV) before or within the wake up signal.

Figure 7A:
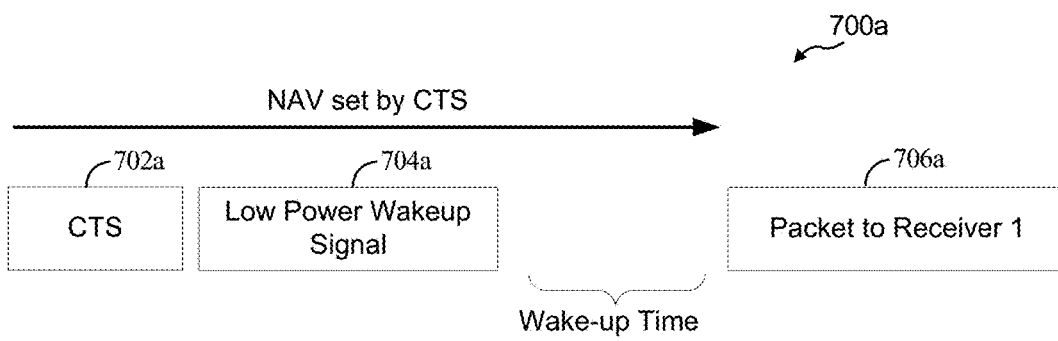
FIGS. 7A and 7B show additional exemplary signal transmissions for transmitting a low power wake up signal, in accordance with an exemplary embodiment of the invention.

FIG. 7A shows another group of exemplary signal transmissions for transmitting a low power wake up signal, in accordance with an exemplary embodiment of the invention. A CTS frame 702a is sent over the wireless medium. Any STA 106 that is able to receive and decode the CTS frame 702a may set its NAV and defer access to the channel for the duration of the low power wake up signal and optionally a wake up time period as well, for example, corresponding to time for executing any commands encoded in the low power wake up signal. After the CTS frame 702a is sent, a low power wake up signal 704a is transmitted. A corresponding low power receiver STA 106e may receive and detect the low power wake up signal, decode any commands and command modification bits in the low power wake up signal 704a, execute the commands according to the information communicated by the command modification bits, and/or execute one or more commands in response to receiving the low power wake up signal, such as activating its transceiver 214. The STA 106 transmitting the low power wake up signal 704a thereafter transmits a packet to the low power receiver STA 106e. In addition, the STA 106 transmitting the low power wake up signal 704a may transmit a null frame during the wake up time as described above. In some implementations, information of the CTS frame 702a may be encoded additionally or alternatively within the low power wake up signal 704a.

Figure 7B:
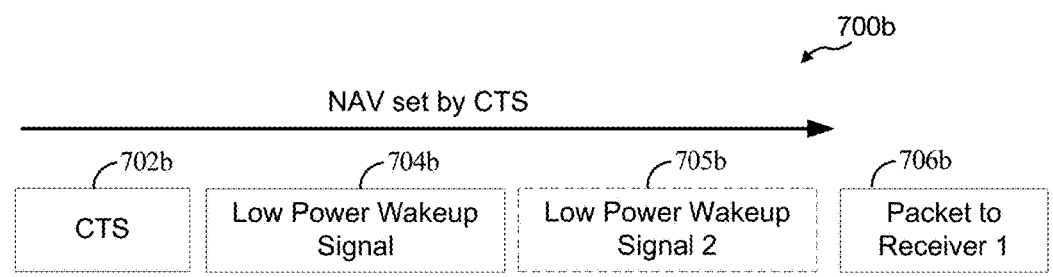

FIG. 7B shows another group of exemplary signal transmissions for transmitting a low power wake up signal, in accordance with an exemplary embodiment of the invention. The frames are the same as FIG. 7A, except that two low power wake up signals 704b and 705b are transmitted. In this case the CTS 702b may indicate to set the NAV for duration of both low power wake up signals 704b and 705b. Thereafter, packets (e.g., packet 706b) are sent the corresponding receiver. In some implementations, information of the CTS frame 702b may be encoded additionally or alternatively within the low power wake up signals 704b and 705b.

Figure 8:
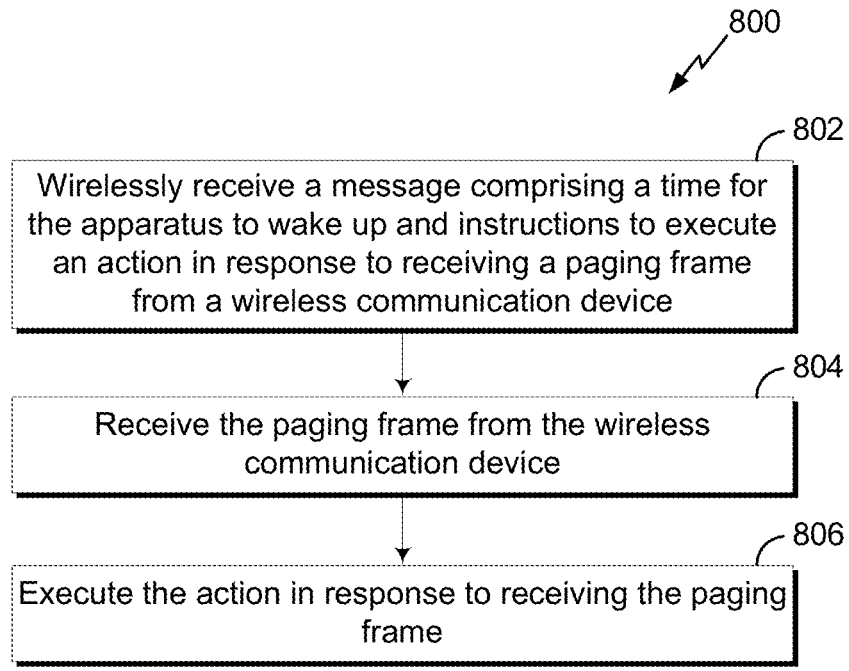
FIG. 8 is a flowchart of an exemplary method of wireless communication, in accordance with an exemplary embodiment of the invention.

FIG. 8 is a flowchart of an exemplary method 800 of wireless communication. The method may be performed by a low power receiver STA 106e. At block 802, a message is wirelessly received, comprising a time for an apparatus to wake up and instruction to execute an action in response to receiving a paging frame from a wireless communication device. For example, the low power receiver STA 106e may include a receiver 212 that may be configured to receive and detect the message. The message may include an action for the STA 106e to execute upon receiving a paging frame or wake up signal. In some implementations, the message may be a target wake up time (TWT) element as will be described in more detail in connection with FIG. 14A, for example. At block 804, the STA 106e may receive the paging frame from the wireless communication device. In some implementations, the STA 106e may receive the paging frame subsequent to receiving message of block 802. For example, the low power receiver STA 106e may include a receiver 212 and/or a wake-up circuit 230 comprising a low power receiver 228 that may be configured to receive and detect the paging frame. The paging frame may comprise a null data packet as will be described in more detail in connection with FIG. 12, for example. The wake up circuit 230 may turn on or power on a transceiver 214. In one aspect, the low power receiver STA 106e is configured to transmit and receive communications via the transceiver 212 according to a standard such as 802.11. At block 806, the STA 106e may execute the action in response to receiving the paging frame. For example, the action may correspond to any one or more of the actions that will be described in more detail in connection with FIG. 14D below.

Figure 9:
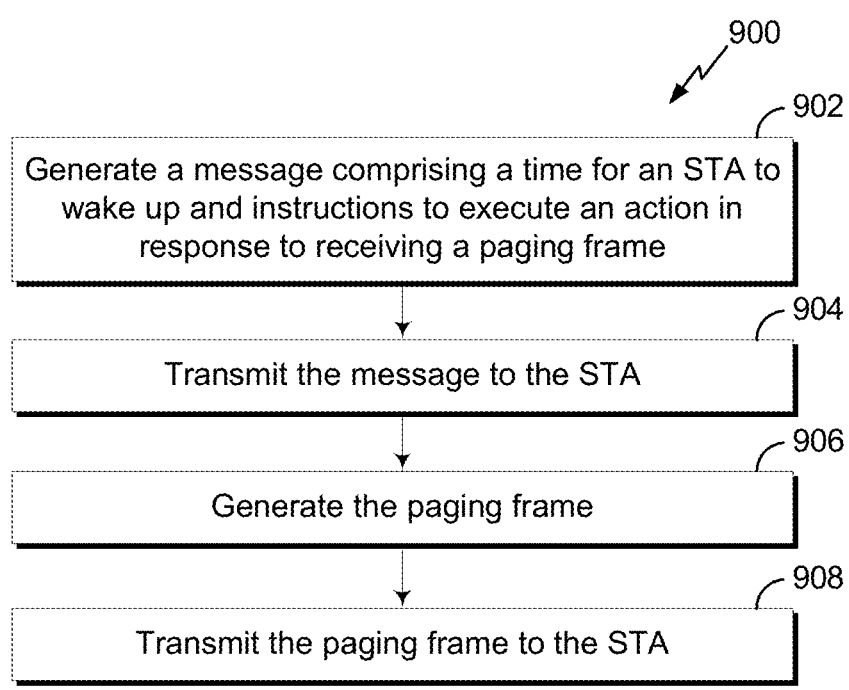
FIG. 9 is a flowchart of another exemplary method of wireless communication, in accordance with an exemplary embodiment of the invention.

FIG. 9 is a flowchart of another exemplary method 900 of wireless communication. The method may be performed by a STA 106 or an AP 104. At block 902, a message is generated comprising a time for an STA to wake up and instructions to execute an action in response to receiving a paging frame. In some implementations, the message may comprise a TWT element as will be described in more detail in connection with FIG. 14A, for example. At block 904, the message is transmitted to the STA. The STA may be a low power receiver STA 106e. At block 906, a paging frame may be generated. In some implementations, the paging frame may be a wake up signal for waking up a low power receiver, for example, the STA 106e. In some implementations, the paging frame may be a null data packet as will be described in more detail in connection with FIG. 12, for example. At block 908, the paging frame is transmitted to the STA.

Figure 10:
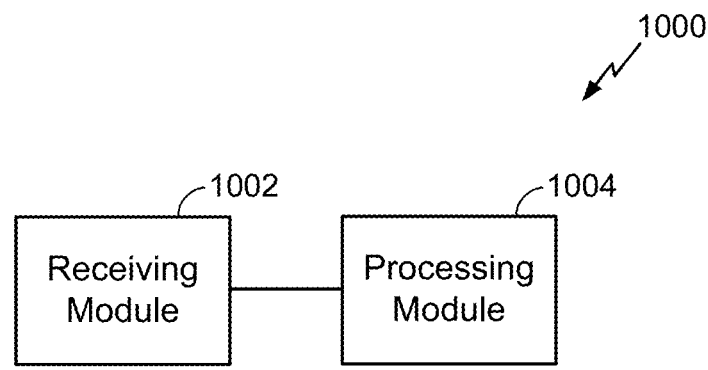
FIG. 10 is a functional block diagram of another exemplary wireless device that may be employed within the wireless communication system of FIG. 1.

FIG. 10 is a functional block diagram of another exemplary wireless device 1000 that may be employed within the wireless communication system 100. Those skilled in the art will appreciate that a wireless communication device 1000 may have more components than the wireless communication devices shown in FIGS. 2-4. The wireless communication device 1000 shown includes only those components useful for describing some prominent features of certain implementations. The device 1000 includes a receiving module 1002 that may be able to receive a wake up signal. In some cases a means for receiving a wake up signal may include the receiving module 1002. The receiving module 1002 may be configured to perform one or more of the functions described above with respect to block 802 of FIG. 8. The receiving module 1002 may correspond to the low power receiver 220. The device 1000 further comprises a processing module 1004 that is configured to determine a command to execute based on the wake up signal. The processing module 1004 may also be configured to cause the command to be executed. The processing module 1004 may correspond to the wake up circuit 230 and/or the processor 204. In some cases, a means for executing a command may include the processing module 1004.

Figure 11:
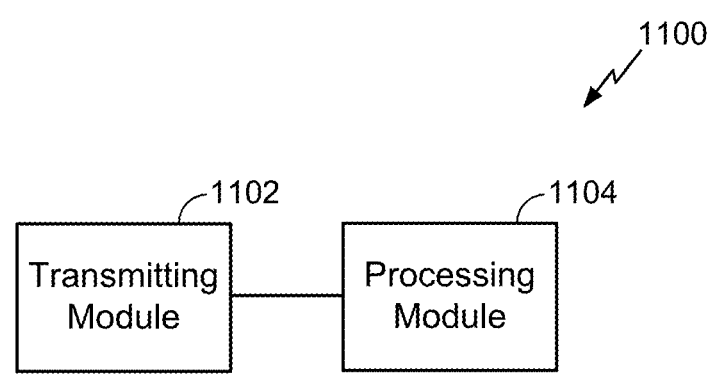
FIG. 11 is a functional block diagram of another exemplary wireless device that may be employed within the wireless communication system of FIG. 1.

FIG. 11 is a functional block diagram of another exemplary wireless device 1200 that may be employed within the wireless communication system 100. Those skilled in the art will appreciate that a wireless communication device 1200 may have more components than the wireless communication devices shown in FIGS. 2-4. The wireless communication device 1100 shown includes only those components useful for describing some prominent features of certain implementations. The device 1100 includes a transmitting module 1102. In some cases a means for transmitting a wake up signal may include the transmitting module 1102. The transmitting module 1102 may be configured to perform one or more of the functions described above with respect to block 904 of FIG. 9. The transmitting module 1102 may correspond to transmitter 210. The device 1100 further comprises a processing module 1104. The processing module 1104 may correspond to the processor 204. In some cases, a means for generating a wake up signal may include the processing module 1104. The processing module 1104 may be configured to perform one or more of the functions described above with respect to block 902 of FIG. 9.

In some implementations, the wake up signal may include a paging signal such as a null date packet (NDP) paging frame. FIG. 12 illustrates one example of a NDP (null data packet) paging frame format, in accordance with aspects of the present disclosure. As shown, the NDP paging fame signal may include, for example, an indication that one or more additional paging frames follow transmission of the paging frame. The paging frame may further include an indication that the paging frame is associated with uplink or downlink transmission. As illustrated, additional bits may be added to a 1 MHz SIG field of an NDP synch frame. According to certain aspects, the fields shown in FIG. 12 may have the following functionality:

P-ID: an identifier of the paged STA(s). For example, 1 bit to indicate if it identifies a single STA or a group of STAs (e.g., 1: single case; =0: group case). The remaining 8 bits: Single STA: Partial MAC address of intended recipient is being used (RA[40:47]). Group of STAs: TBD. Group ID shall not be all zero. BU bit can be removed. Reserve P-ID=0 to indicate no BUs. Partial TSF (TSF[x:x+5] is being used and x will be decided between AP and STA at the setup time).

Check Beacon: the last bit of check beacon sequence number, for example, as indicated in the NDP Paging signaling is useful in scenarios where it needs to be sent frequently (to meet application latency requirements). In this case the likelihood of multiple beacon changes within a NDP Paging interval is very low or 0 (in case it is sent per each beacon interval).

The More NDP field may indicate if there is at least other NDP Paging signals following (e.g., after SIFS). This may be useful in case AP allocates same NDP Paging time to multiple STAs and wants to page more than one STA individually.

The NDP frame as shown is described for downlink paging, wherein the frame is transmitted from an AP to one or more stations. However, the techniques presented here may also be used for uplink NDP Paging. Similarly as for the DL case, NDP Paging signal can be used by a STA to regularly inform AP about uplink buffered data, for example, UL indication used in RAW/TWT scheduling decisions.

To use the NDP message in uplink, techniques presented herein may use one of the reserved bits for flow indication (UL/DL). This may help avoid that UL messages are mistaken by DL messages in OBSS or other STAS in same BSS. The techniques may also use the (Check Beacon+Partial TSF+More NDP) fields (totally 8 bits) as the Partial MAC address of the Transmitter in UL. It should be noted that in the uplink there may be no need for any of these. Thus, the P-ID field may be used in a normal way, the receiver partial MAC address.

As described herein, techniques presented herein may provide a definition of the NDP Paging message fields. The technique provides a mechanism for use of the NDP Paging message for uplink indication, and using 1 bit to indicate UL/DL.

Figure 13A:
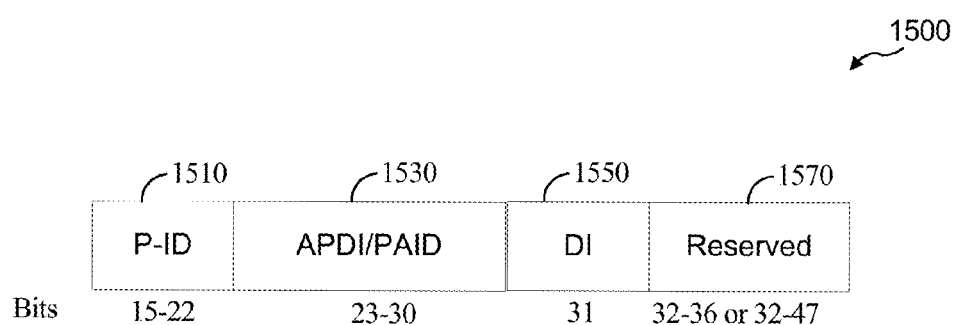
FIG. 13A shows another example of an NDP paging frame format in accordance with an embodiment of the invention.

FIG. 13A shows another example of an NDP paging frame format in accordance with an embodiment of the invention. The NDP control frame 1500 (also referred to as the NDP paging frame) includes a P-ID field 1510, which is an identifier of the paged device. The DI field 1550 is a direction identifier. In certain implementations, if the NDP paging frame is sent by a non-AP station to an AP, then the DI field shall be set to 1. If the NDP paging frame is sent by an AP, then the DI field should be set to 0. A field 1570 is reserved. Depending on whether the communication uses a bandwidth of 1 or 2 MHz, the field 1570 can include either the 32nd to 36th bits or the 32nd to 47th bits respectively. The APDI/PAID field 1530 is set to either APDI or PAID, depending on the value of the DI field. If the DI field is set to 1, the APDI/PAID field is set to PAID (Transmitter Partial AID), which is set to the PAID of the transmitter non-AP station. If the DI field is set to 0, the APDI/PAID field is set to APDI.

In one implementation, the DI field may be set to 1 from one direction only and 0 on the other direction. The DI field may be set to 1 or 0 for both directions, or may be set to 0 based on station agreements. The DI field may be set in a random fashion or as indicated by a timer.

Figure 13B:
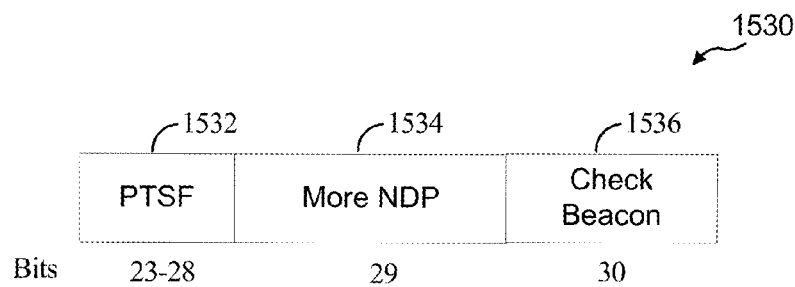
FIG. 13B shows an exemplary structure of the APDI field from FIG. 13A in accordance with an embodiment of the invention.

FIG. 13B shows an exemplary structure of the APDI field 1530 from FIG. 13A in accordance with an embodiment of the invention. The APDI field 1530 has a PTSF field 1532, which includes the partial TSF of the transmitting station. A Check Beacon bit 1536 indicates changes in the beacon. A More NDP field 1534 is set to one if the NDP Paging frame is followed by another NDP Paging frame.

In some implementations, a target wakeup time (TWT) signal such as a TWT information element may be used to schedule a target wakeup time at which a wake up signal such as the paging frame (shown in FIGS. 12 and 15A-15B) will be sent. Subsequently, a paging frame is transmitted at the target wakeup time as scheduled by the TWT signal. The TWT signal may include an optional NDP paging (NP) field which defines the action of a station upon reception of the wake up signal. For example, a STA can send a TWT signal to an AP requesting that a wake up signal be sent at a suggested time for the TWT, and if data is pending, the AP sends a wake up signal directed to the STA, at the suggested Target Wakeup Time. The TWT signal may also define the action of the STA upon reception of the wake up signal. When the STA receives the wake up signal from the AP, the STA will carry out the action as specified in the TWT signal.

FIG. 14A shows a structure of an exemplary TWT information element 1600 in accordance with an embodiment of the invention. The TWF information element 1600 includes an IEID field 1610 indicating the identification for the information element. A length field 1620 indicates the length of the information element. A control field 1622 contains certain control information. A request type (RT) field 1630 indicates the request type. A target wakeup time (TWT) field 1640 indicates the target wakeup time. A TWT group assignment field 1642 contains information related to assignment of TWT groups. A nominal minimum wake duration field 1650 indicates the minimum wake duration. A wake interval Mantissa (WiM) field 1660 indicates the wake interval Mantissa for required wake interval for indicated duration. A TWT channel 1662 indicates the channel for the TWT information element. In one implementation, all fields of the TWT information element 1600 except the NDP paging (NP) field 1670 are as defined in the 802.11ah standard. In one implementation, the length field indicates the presence of the NP field 1670 if the Length field is set to a particular value (e.g., a value greater than 16).

FIG. 14B shows a structure of an exemplary TWT group assignment field 1642 from FIG. 14A in accordance with an embodiment. In one implementation, the TWT group assignment field 1642 is as defined in the 802.11ah standard. The TWT group assignment field 1642 includes a group ID field 1643, a zero offset of the group field 1644, the TWT unit group 1645, and the increment within group field 1646. As shown in each of FIGS. 14A and 14B, each field may comprise an exemplary number of octets. In some implementations, an octet may comprise 1 byte (B). In some implementations, a byte may comprise 8 bits. Thus, in some implementations, one octet may comprise 8 bits. Moreover, although exemplary bit, byte and/or octet numbers or ranges are described for particular fields in each of FIGS. 12-14D, such numbers and/or ranges are not limiting and particular fields may comprise different numbers or ranges of bits, bytes and/or octets based on a particular implementation.

Figure 14C:
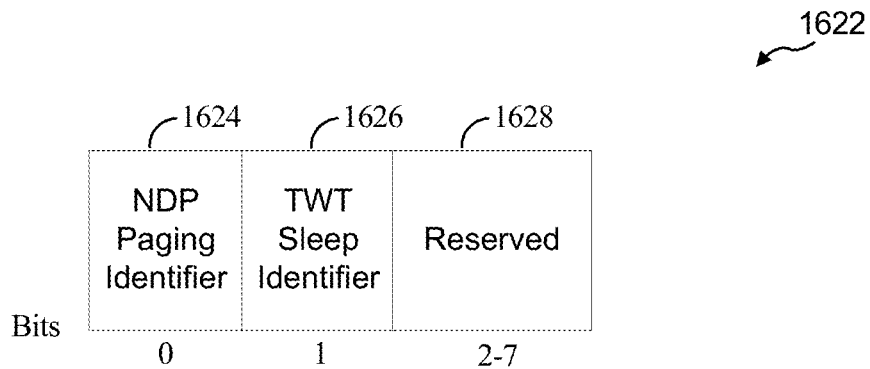
FIG. 14C shows a structure of an exemplary control field 1622 from FIG. 14A in accordance with an embodiment.

FIG. 14C shows a structure of an exemplary control field 1622 from FIG. 14A in accordance with an embodiment. In one implementation, the control field 1622 is as defined in the 802.11ah standard. The control field 1622 includes a NDP paging identifier field 1624, a TWT sleep identifier field 1626. In one implementation, each of the NDP paging identifier field 1624 and TWT sleep identifier 1626 includes one bit. The remaining bits 2-7 are reserved.

Figure 14D:
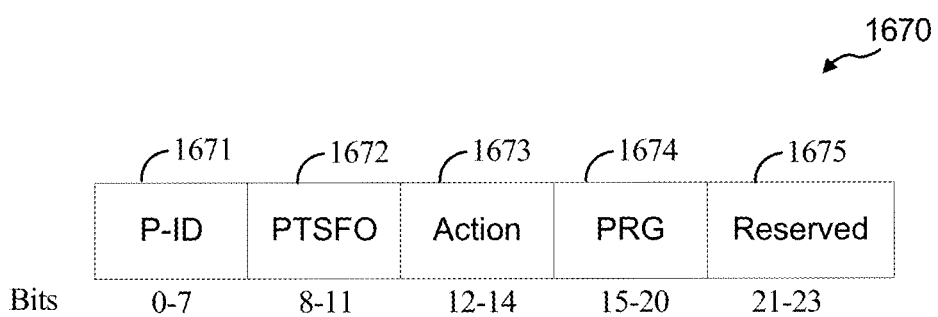
FIG. 14D shows an exemplary format for the NDP Paging (NP) field 1670 from FIG. 14A in accordance with an embodiment of the invention.

FIG. 14D shows an exemplary format for the NP field 1670 from FIG. 14A in accordance with an embodiment of the invention. In certain implementations, the NP field 1670 includes a P-ID field 1671 which indicates the paging identification. A PTSFO field 1672 indicates the partial TSF offset such as one described in 802.11ah standard. An Action field 1673 defines the action of the station upon reception of an NDP paging frame with the P-ID field matching the P-ID field in NP field in the respond TWT IE in the setup phase of NDP paging. Different values of the Action field represent different actions as listed below.

0=Send a PS-Poll
1=Wait for packet reception
2=STA receives the Beacon
3=STA receives the delivery traffic indication message (DTIM) Beacon
4-7=reserved A PRG field 1674 indicates the offset time a station is capable of receiving other types of packets other than NDP paging. The offset is computed as the units of SIFS. In one implementation, the Bit number 15 of the NP field may be reserved.

As mentioned above, the NDP paging may be set up using the TWT IE 1600 (shown in FIG. 14A) and subsequently be performed using the NDP paging frame 1500 (shown in FIG. 13A). Further details of the NDP paging procedures are described as follows. In one implementation, the NDP paging procedure defines a protocol for power saving at a STA by using the TWT protocol to setup scheduled wakeup intervals and by defining an efficient signaling for the presence of buffered units (Bus) and synchronization.

A TWT requester STA that setup a TWT with a TWT responder STAs can further request the TWT responder STA to send an NDP Paging frame (1500) to the TWT requesting STA during TWT to indicate if it has BUs for the TWT requester STA by setting the NDP Paging indicator bit to 1 in TWT setup exchange. A responder STA can also send the NDP Paging frame for conveying synchronization information and/or to indicate the status of the Beacon. If no NDP Paging frame is received during the TWT, the TWT requester STA may sleep at the end of the minimum awake time (as indicated by the MWD field 1640 shown in FIG. 14A) for the TWT. If an NDP Paging frame is received, the TWT requester STA will behave as indicated in this clause depending on the indications include in the frame. In particular, the STA may transmit a request for pending BUs, schedule to be awake at the next Beacon or simply wait for data.

NDP Paging setup includes the exchange of one TWT IE of request type and one TWT IE of response type with the NDP Paging indicator set to one and the NDP Paging Field present as follows:

1. NDP Paging Setup Request:
   An NDP Paging Setup Request is defined as a frame that contains a TWT Request IE with the NDP Paging Identifier set to one and NDP Paging subfield present.

An NDP Paging Requesting STA is defined as TWT Requesting STA if the NDP Paging Identifier is set to one in the TWT Request.

A non-AP STA may send one or more NDP Paging Request frames to a recipient STA, in which case the sender STA shall set the P-ID field to one of its assigned AIDs and the Action field is reserved.

An AP may send one or more NDP Paging Request to a recipient STA, in which case the P-ID field may be set to any value.

2. NDP Paging Setup Response:
   An NDP Paging response is defined as a frame that contains a TWT Response IE with the NDP Paging Identifier is set to one and NDP Paging subfield is present.

An NDP Paging Responding STA is defined as TWT Responding STA if the NDP Paging Identifier is set to one in the TWT Response.

Upon receiving an NDP Paging Request, the recipient STA shall respond with an NDP Paging Response. A STA sending an NDP Paging response to an AP shall set the P-ID to the same value as the P-ID from the request. A STA sending an NDP Paging response to a non-AP STA should set the P-ID to the same value as the P-ID from the request. An NDP Paging Responder shall set the Action field as described above with regard to FIG. 14D. The PTSFO field in an NDP Paging response frame is reserved.

A STA which has setup NDP Paging successfully is referred as paged STA if it receives an NDP Paging frame with the P-ID set to either the same value as P-ID in the NDP Paging Response or 0. A paged STA may behave as defined by value of the Action sub-field of the NDP Paging field in the TWT response as follows:

Action field=0: STA shall send the PS-Poll
Action field=1: STA shall be able to receive any packet types after PRG units of SIFS after the end of reception of the NDP Paging frame
Action field=2: STA shall receive the next Beacon or Short Beacon that happens in the TBTT after PRG units of SIFS after the end of reception of the NDP Paging frame
Action field=3: STA shall receive the next DTIM that happens after PRG units of SIFS after the end of reception of the NDP Paging frame After the TWT IE is transmitted, an NDP paging frame is then transmitted at the TWT as scheduled by the TWT IE. For example, a station sending a TWT IE as a response shall schedule an NDP Paging frame as the next frame for transmission at the time indicated by the TWT field in the response if one of the following conditions is satisfied:

There are buffered units (Bus) intended for the AP.
There are BUs intended for the non-AP station with the AID indicated in the request.
There is a critical update to the Beacon has occurred.

The DI field of the paging frame is a direction identifier. If the NDP Paging frame is sent by a non-AP station to an AP, then the DI field shall be set to 1. If the NDP Paging frame is sent by an AP, then DI field shall be set to 0.

The P-ID field of the NDP Paging frame shall be set to the P-ID field in a TWT IE response if there are BUs for the requestor station. The P-ID field of NDP Paging frame shall not be set to the P-ID field of TWT response if there are no BUs for the requestor station. In one implementation, a P-ID value of all zeros can be used for broadcast information.

A station sending a request and receiving a response shall read the next DTIM if it receives an NDP Paging with the P-ID set to all zeros and the Check Beacon not changed (the same as advertised at least once before.)

The PAID field of the NDP paging frame may be decided depending on the value of the DI field. If the DI field is set to 1, the PAID field in the NDP Paging frame shall be set to the PAID of the transmitter non-AP STA. If the DI field is set to 0, the APDI field in the NDP Paging frame shall be set as follows:

- The PTSF field is set to TSF [e.g., PTSFO+4:PTSFO+9], where TSF is the 8 bytes value of the TSF and PTSFO is the value of the PTSFO field in the TWT request.
- The Check Beacon field is initialized to 0 and incremented when a critical update to the Beacon frame has occurred. If a Broadcast TIM is used, and no critical update to the Beacon frame occurred in the time between the transmission of an NDP Control frame and a TIM Broadcast frame, then the value of the Check Beacon field in the Paging request frame shall be same as the LSB of the Check Beacon field in the TIM Broadcast frame.
- More NDP is set if there is one NDP paging frame following after SIFS time.

In some implementations, the TWT IE may include additional instructions for a station receiving it other than the suggested TWT. In one implantation, the behavior for the stations and APs during the duration of the TWT may be defined in accordance with one of at least four alternative options as described below. In a first option, a station sending a request and receiving a response may ignore any frames sent to it during the time indicated by the minimum awake time field in TWT IE response other than frame type NDP Paging. In a second option, the AP shall send the NDP Paging as the first frame for the NDP Paging STA in the TWT duration. The STA goes to sleep immediately after receiving the NDP Paging frame unless otherwise indicated by the NDP Paging. In a third option, the STA is allowed not to decode any frame other than the NDP paging during the TWT. The STA also is not allowed to send any packet during the TWT, unless otherwise instructed by the command in the NDP. In a fourth option, the AP may not send any frame other than the NDP paging frame to the STA for the duration of the TWT.

In one implantation, a station sending a request and receiving a response which is being paged by NDP Paging frame, may ignore any frames sent to it from the end of the NDP Paging frame for the duration indicated by the PRG field in TWT IE in units of SIFS.

In one implementation, an STA sending a request and receiving a response shall extend the minimum awake duration to receive the next NDP Paging frame if the More NDP bit is set to 1. An STA sending a request and receiving a response shall receive the Beacon or Short Beacon frame at the next target beacon transit time (TBTT) if it receives any NDP Paging with the Check Beacon bit value different from what previously received.

In one implementation, if a paged station is interested in time sync with a pager station, the pager station should set the DI bit to 0 and set the PTSF field to the correct value. If the paged station may be paged by different pager stations, the pager should set the DI bit to 1 to indicate its identify by putting its PAID in the PAID field.

In one implementation, if the TWT sleep identifier 1626 (see FIG. 14C) is set in TWT request/response exchange, the STA that set this bit may be in a sleep state outside the TWT adjusted sleep period, unless it explicitly determines via another TWT or RAW.

In one implementation, an AP will send the NDP Paging frame as the first frame to a STA during the agreed NDP TWT period if a) there are buffer units for the STA, b) there are critical changes to the beacon, or c) a max time from the previous NDP Paging frame has expired (for time synch purpose and also latency requirement guarantee). The max time may, for example, be equal to the TWT period. Otherwise, the AP shall not send any frame to the STA.

In one implementation, a STA will listen to the medium for an NDP Paging frame from an AP at the agreed NDP TWT period. After receiving the NDP Paging frame, the STA may go to sleep and wakeup later to perform an action. Such action may include a) sending PS-Poll/trigger frame, b) wakeup after T (time unit), and c) receiving the Beacon.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communications, comprising:
   a processor configured to:
      generate a message comprising a target wake up time information element indicating a first time for a wireless communication device to wake up and instructions to execute an action in response to receiving a paging frame from the apparatus, the first time for the wireless communication device to wake up indicating at least a second time at which the paging frame is transmitted; and
      generate the paging frame; and
   a transmitter configured to:
      transmit the message to the wireless communication device; and
      subsequently transmit the paging frame to the wireless communication device based on the indicated second time.

2. The apparatus of claim 1, wherein the paging frame includes an address of the paging frame.

3. The apparatus of claim 1, wherein the paging frame comprises a direction field having a value indicating whether the apparatus is an access point.

4. The apparatus of claim 1, wherein the paging frame is selectably configurable to store timing information.

5. The apparatus of claim 1, wherein the paging frame comprises a null data packet.

6. The apparatus of claim 1, wherein the action includes one or more of:
   sending a power save poll frame,
   waiting for packet reception,
   receiving a beacon, and
   receiving a delivery traffic indication message beacon.

7. The apparatus of claim 1, wherein the message indicates a time period including the indicated second time during which the wireless communication device is to be awake, and the paging frame is the first frame the apparatus is configured to transmit to the wireless communication device during the indicated time period.

8. The apparatus of claim 1, wherein the message indicates a time period including the indicated second time during which the wireless communication device is to be awake, and the apparatus is further configured to refrain from transmitting any frame other than the paging frame to the wireless communication device during the indicated time period.

9. The apparatus of claim 1, wherein the transmitter is further configured to transmit the message at a third time that is different from the first time for the wireless communication device to wake up.

10. A method for wireless communications, comprising:
generating a message comprising a target wake up time information element indicating a first time for a wireless communication device to wake up and instructions to execute an action in response to receiving a paging frame from the apparatus, the first time for the wireless communication device to wake up indicating at least a second time at which the paging frame is transmitted;
transmitting the message, from an apparatus, to the wireless communication device;
generating the paging frame; and
subsequently transmitting the paging frame to the wireless communication device based on the indicated second time.

11. The method of claim 10, wherein the paging frame includes an address of the paging frame.

12. The method of claim 10, wherein the paging frame comprises a direction field having a value indicating whether the apparatus is an access point.

13. The method of claim 10, wherein the paging frame is selectably configurable to store timing information.

14. The method of claim 10, wherein the paging frame comprises a null data packet.

15. The method of claim 10, wherein the action includes one or more of:
sending a power save poll frame,
waiting for packet reception,
receiving a beacon, and
receiving a delivery traffic indication message beacon.

16. The method of claim 10, wherein the message indicates a time period including the indicated second time during which the wireless communication device is to be awake, and the paging frame is the first frame transmitted to the wireless communication device during the indicated time period.

17. The method of claim 10, wherein the message indicates a time period including the indicated second time during which the wireless communication device is to be awake, the paging frame being the only frame transmitted from the apparatus to the wireless communication device during the indicated time period.

18. The method of claim 10, further comprising transmitting the message at a third time that is different from the first time for the wireless communication device to wake up.

19. An apparatus for wireless communications, comprising:
means for generating configured to:
generate a message comprising a target wake up time information element indicating a first time for a wireless communication device to wake up and instructions to execute an action in response to receiving a paging frame from the apparatus, the first time for the wireless communication device to wake up indicating at least a second time at which the paging frame is transmitted; and
generate the paging frame; and
means for transmitting configured to:
transmit the message to the wireless communication device; and
subsequently transmit the paging frame to the wireless communication device based on the indicated second time.

20. The apparatus of claim 19, wherein the paging frame includes an address of the paging frame.

21. The apparatus of claim 19, wherein the paging frame comprises a direction field having a value indicating whether the apparatus is an access point.

22. The apparatus of claim 19, wherein the paging frame is selectably configurable to store timing information.

23. The apparatus of claim 19, wherein the paging frame comprises a null data packet.

24. The apparatus of claim 19, wherein the action includes one or more of:
sending a power save poll frame,
waiting for packet reception,
receiving a beacon, and
receiving a delivery traffic indication message beacon.

25. The apparatus of claim 19, wherein the message indicates a time period including the indicated second time during which the wireless communication device is to be awake, and the paging frame is the first frame the means for transmitting is configured to transmit to the wireless communication device during the indicated time period.

26. The apparatus of claim 19, wherein the message indicates a time period including the indicated second time during which the wireless communication device is to be awake, and the means for transmitting is further configured to refrain from transmitting any frame other than the paging frame to the wireless communication device during the indicated time period.

27. The apparatus of claim 19, wherein the means for transmitting is further configured to transmit the message at a third time that is different from the first time for the wireless communication device to wake up.

28. A system for wireless communications, comprising:
a first apparatus for wireless communications, comprising:
a first processor configured to:
generate a message comprising a target wake up time information element indicating a first time for a second apparatus for wireless communications to wake up and instructions to execute an action in response to receiving a paging frame from the apparatus, the first time for the second apparatus for wireless communications to wake up indicating at least a second time at which the paging frame is transmitted; and
generate the paging frame; and
a transmitter configured to:
transmit the message to the second apparatus for wireless communications; and
subsequently transmit the paging frame to the second apparatus for wireless communications based on the indicated second time; and
a second apparatus for wireless communications, comprising:
a receiver configured to:
wirelessly receive the message from the first apparatus for wireless communications; and
subsequently receive the paging frame from the first apparatus for wireless communications; and
a second processor configured to execute the action in response to receiving the paging frame.

29. The system of claim 28, wherein the paging frame includes an address of the paging frame, and wherein receiving the paging frame comprises comparing the address of the paging frame with an address of the second apparatus for wireless communications.

30. The system of claim 28, wherein the paging frame comprises a direction field having a value indicating whether the first apparatus for wireless communications is an access point.

31. The system of claim 28, wherein the paging frame is selectably configurable to store timing information.

32. The system of claim 28, wherein the paging frame comprises a null data packet.

33. The system of claim 28, wherein the action includes one or more of:
sending a power save poll frame,
waiting for packet reception,
receiving a beacon, and
receiving a delivery traffic indication message beacon.

34. The system of claim 28, wherein the message indicates a time period including the indicated second time during which the second apparatus for wireless communications is to be awake, and the paging frame is the first frame the first apparatus for wireless communications is configured to transmit to the second apparatus for wireless communications during the indicated time period.

35. The system of claim 28, wherein the message indicates a time period including the indicated second time during which the second apparatus for wireless communications is to be awake, and the first apparatus for wireless communications is further configured to refrain from transmitting any frame other than the paging frame to the second apparatus for wireless communications during the indicated time period.

36. The system of claim 28, wherein the second apparatus for wireless communications is further configured to, after receiving the paging frame, go to sleep and wake up later to perform the action.

37. The system of claim 28, wherein the transmitter is further configured to transmit the message at a third time that is different from the first time for the second apparatus for wireless communications to wake up.

* * * * *